July 22, 1947.  E. O. KEATHLEY  2,424,468
SPRAYING MACHINE
Filed Nov. 30, 1943  3 Sheets-Sheet 1

Inventor
EMERSON ORELL KEATHLEY

By Clarence A. O'Brien
and Harvey B. Jacobson
Attorneys

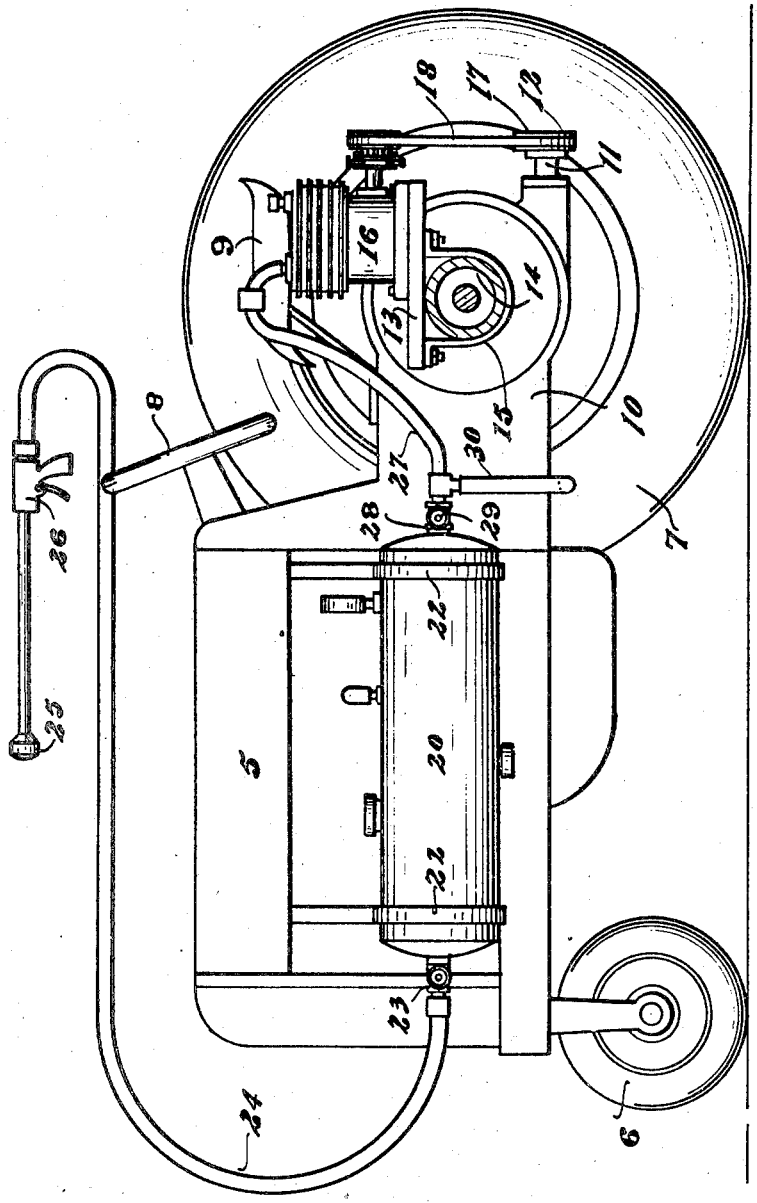

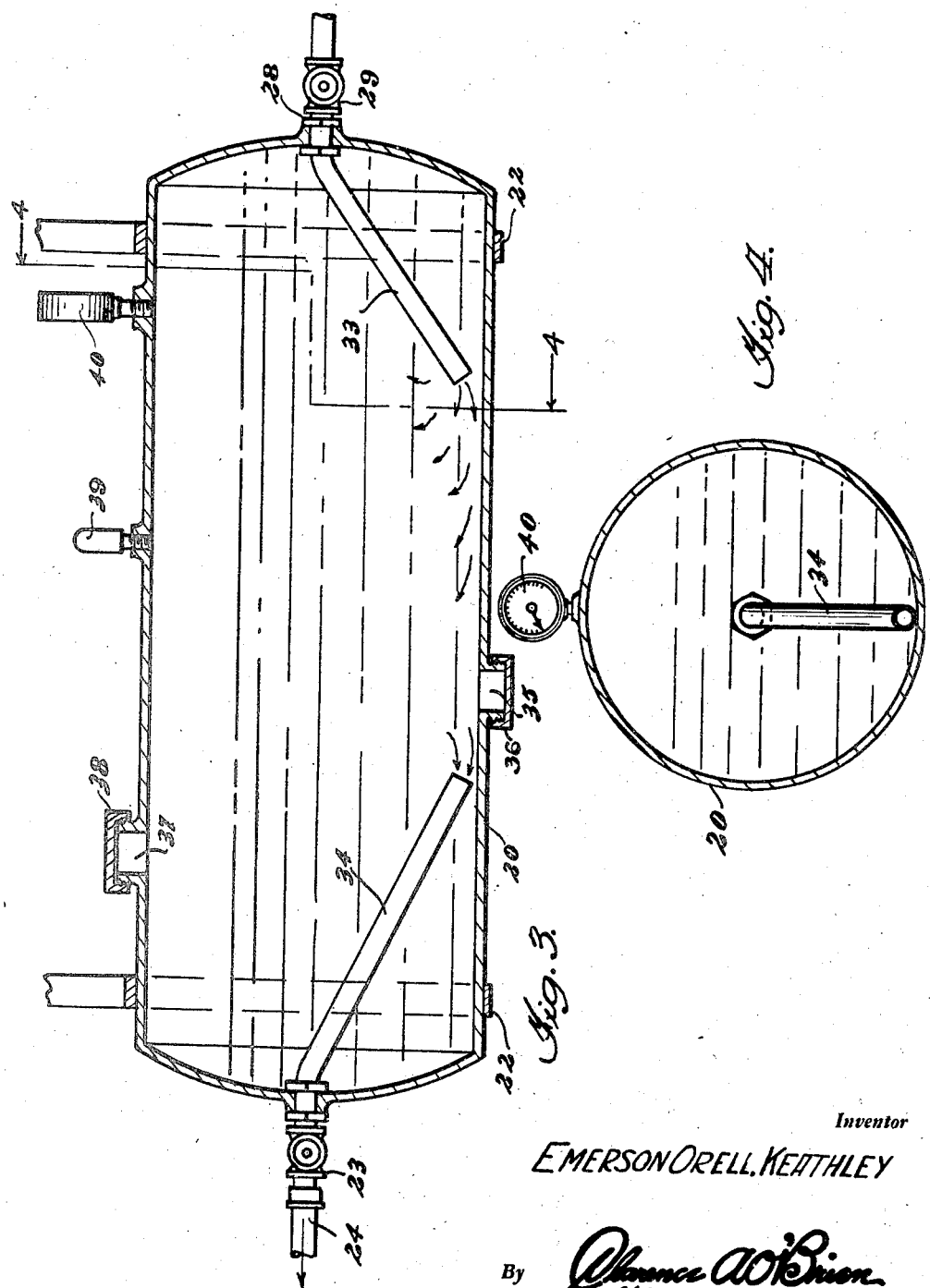

Patented July 22, 1947

2,424,468

UNITED STATES PATENT OFFICE 2,424,468

SPRAYING MACHINE

Emerson Orell Keathley, Tiptonville, Tenn.

Application November 30, 1943, Serial No. 512,385

1 Claim. (Cl. 299—40)

This invention relates to certain new and useful improvements in spraying machines, and the primary object of the invention is to provide a machine of this kind which is especially useful in spraying trees in orchards with insecticides, and for performing various other spraying operations found necessary on a farm.

More particularly, the present invention contemplates the provision of certain equipment in combination with and mounted upon a conventional farm tractor, whereby the power plant of the tractor may be effectively utilized to drive an air compressor used to place the liquid to be sprayed under pressure, tanks being mounted upon the tractor for containing the liquid to be sprayed, and said tanks having a discharge hose provided with a spray nozzle and having means to control the discharge of liquid therefrom.

A specific object of the present invention is to provide equipment of the above kind which may be conveniently mounted upon the tractor so that the air compressor may be effectively driven from the power plant of the tractor and so that the weight of the equipment is properly distributed with respect to the tractor for safety and compactness.

Other objects are to provide for effective stirring or mixing of the material to be sprayed and to provide equipment which is very simple in construction and capable of being produced at a very low cost.

Other objects and specific features of the invention will become apparent from the following description when considered in connection with the accompanying drawings.

In the drawings, wherein like reference characters indicate corresponding parts throughout the several views:

Figure 2 is a longitudinal section taken on line 2—2 of Figure 1.

Figure 3 is an enlarged fragmentary section through one of the tanks for the material to be sprayed, taken on the plane of line 3—3 of Figure 1, and Figure 4 is a transverse vertical section taken on line 4—4 of Figure 3.

Figure 1:
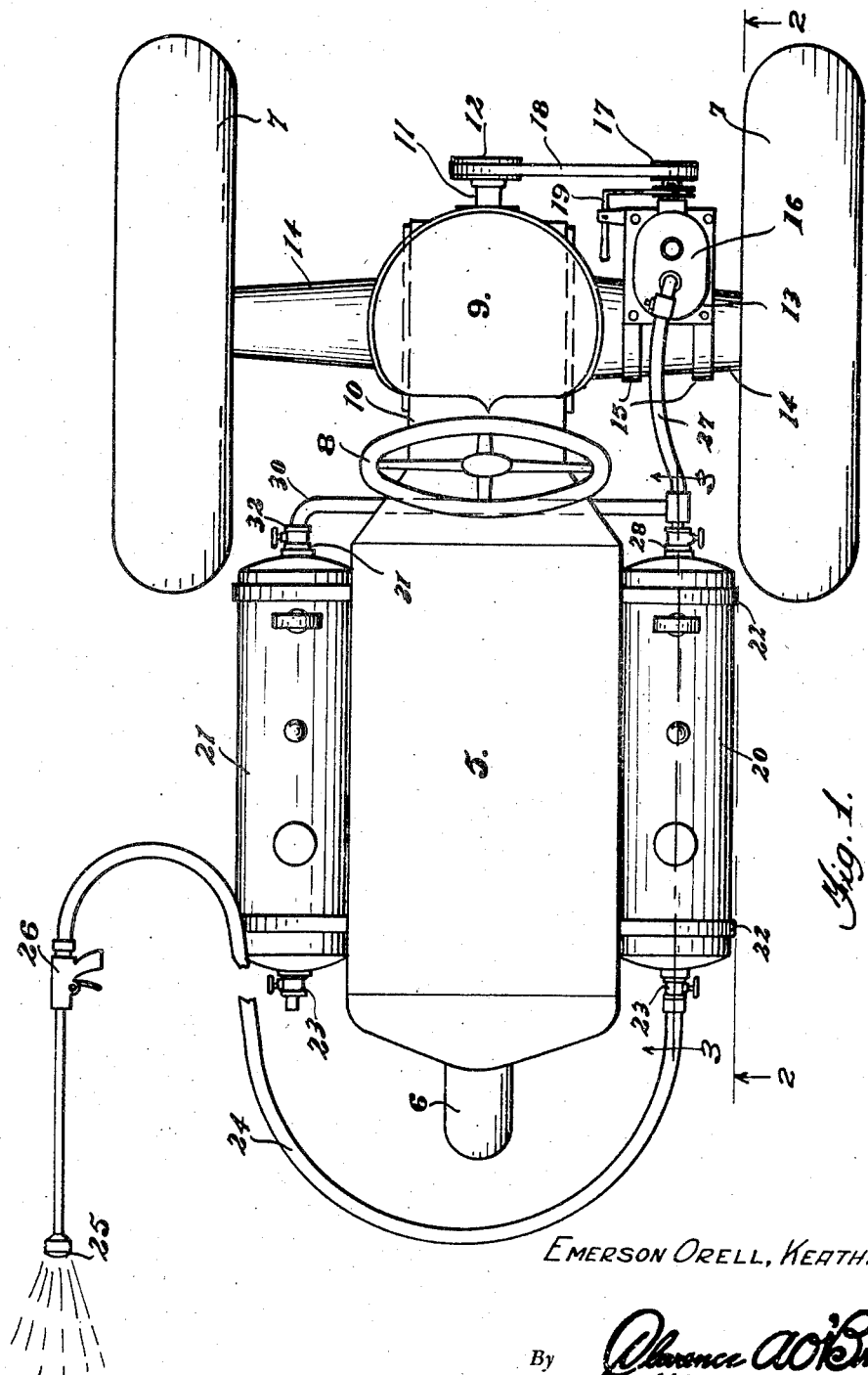
Figure 1 is a top plan view, partly broken away, showing a farm tractor equipped with spraying apparatus constructed in accordance with the present invention.

Referring in detail to the drawings, I have shown a conventional type of farm tractor having a power plant at 5, a front steering and supporting wheel 6, rear driving and supporting wheels 7, a steering hand wheel 8, a driver's seat 9, a rear transmission housing 10, and a driven shaft 11 projecting rearwardly from the transmission housing 10 and equipped with a suitable power take-off pulley 12.

In accordance with the present invention, there is provided a small platform 13 rigidly mounted upon the rear axle housing 14 of the tractor at one side of the driver's seat 9, by means including securing straps 15 passing about said housing 14 and bolted to the under side of the platform. A compressor 16 is bolted upon platform 13 and is arranged with its drive shaft projecting rearwardly so that the pulley 17 on said drive shaft is in transverse alignment with the power take-off pulley 12. An endless power transmission belt 18 passes around the pulleys 12 and 17 so that the compressor may be driven from the shaft 11 of the tractor. Any suitable means may be provided, as at 19, to throw the compressor into or out of operation, such as means for clutching and unclutching pulley 17 from the drive shaft of the compressor and operable from the driver's seat 9.

Elongated tanks 20 and 21 are rigidly mounted on the tractor in a horizontal position at opposite sides of the power plant at 5, as by means of straps 22 passing around the ends of the tanks and bolted to the tractor. These tanks are adapted to receive the material to be sprayed, which is often composed of several ingredients which must be kept thoroughly mixed. Each of the tanks has an outlet at the forward end controlled by a shut-off valve 23 and to the outlet of which may be coupled one end of a discharge hose 24 having at its outer end a spray head 25 equipped with a hand-operated control valve at 26. An air outlet pipe in the form of a flexible hose indicated at 27 is provided for compressor 16, and the same extends forwardly to the rear end of the tank 20 at this side of the tractor. The pipe 27 is coupled to the rear inlet of tank 20, as at 28, and a shut-off valve 29 is provided in this connection. Also, a branch pipe 30 extends laterally from the pipe 27 in advance of the valve 29 and passes under the tractor frame and then upwardly to a point adjacent the rear end of tank 21 where it is coupled to the inlet at the rear end of the latter, as at 31. A shut-off valve 32 is provided in the branch pipe 30 adjacent the tank 21. It will thus be seen that the contents of tank 20 may be placed under pressure by supplying compressed air to the tank from the compressor while valve 29 is open and valve 32 is closed. Upon opening valve 23, the control valve 26 may be actuated to effect spraying of the material through the spray head 25 as it is discharged from tank 20. Should removal of hose 24 be required for cleaning of the same or its spray head, valve 23 will be first closed. After the contents of tank 20 are exhausted, the hose 24 may be coupled to the outlet of tank 21 for continuing the spraying operation, at which time valves 23 and 32 of tank 21 will be opened and valve 29 will be closed. However, an outlet hose may be simultaneously placed on the outlet of both tanks so that material may be sprayed from both tanks at the same time upon opening all of the valves 23, 29 and 32.

As shown more clearly in Figures 3 and 4, the inlet of tank 20 or tank 21 includes a pipe 33 that extends inwardly of the tank and downwardly to a point adjacent the bottom thereof. This causes the compressed air to be discharged in the tank near the bottom of the latter before rising to the top thereof, thereby agitating the material in the tank and keeping it thoroughly mixed. Also, the outlet of each tank includes a pipe 34 extending to a point near the bottom of the tank at its inlet end, thereby causing the liquid to be sprayed to be taken from the bottom of the tank at all times. Each of the tanks has a large drain and cleanout opening, as at 35, normally closed by a removable cap 36, and a top filler opening 37 normally closed by a removable cap 38. In addition, each tank is provided at the top with a conventional safety pressure relief valve 39 and a pressure gauge 40 facing toward the driver's seat.

In use, the pulley 17 will be clutched to the drive shaft of compressor 16 and, when the power plant of the tractor is in operation, power is taken by the belt 18 from driven shaft 11 so as to operate the compressor. By opening valve 29 and/or valves 32, the contents of either or both tanks may be placed under pressure. When the required pressure has been attained, the compressor 16 is thrown out of operation and valves 29 and/or 32 are closed. Assuming that one tank is in use, such as the tank 20, the valve 23 of the latter is opened. An attendant will then direct the spray head to the thing or surface to be sprayed, controlling the discharge of material by actuation of valve 26. If a discharge hose is provided on both tanks, two attendants may simultaneously spray trees at both sides of the tractor as the latter moves along a path between rows of trees. However, it is to be readily seen that the apparatus is capable of general use for many different kinds of spraying operations, either while the tractor is traveling or is at a standstill. The equipment is very simple so that it can be readily installed and cheaply manufactured. There are not many parts which may get out of order, and the equipment is convenient to install and use. A balanced arrangement is had by mounting the tanks upon opposite sides of the tractor power plant, and the compressor is arranged for convenient driving connection with the power take-off pulley of the tractor.

What I claim as new is:

In combination with a farm tractor having a forward power plant and provided at the rear with a rear axle housing and a rearwardly projecting power take-off shaft; storage tanks for liquid to be sprayed rigidly mounted at opposite sides of said power plant and extending longitudinally thereof, a compressor mounted over the rear axle having a drive shaft, pulleys carried by the drive shaft and the power take-off shaft, a belt trained about said pulleys for transmitting rotary motion from the power take-off shaft to said drive shaft, said tanks having front outlets provided with shut-off valves and rear air inlets provided with shut-off valves, a pipe connecting the outlet of said compressor with the valve at the rear end of one tank, a branch pipe leading from the first pipe to the valve at the rear end of the other tank, and an outlet hose attachable to the outlet of either tank and provided at is outer end with a spray head.

EMERSON ORELL KEATHLEY.

REFERENCES CITED

The following references are of record in the file of this patent:

UNITED STATES PATENTS

| Number | Name | Date |
| --- | --- | --- |
| 1,509,222 | Bayne | Sept. 23, 1924 |
| 2,109,384 | Gallupe | Feb. 22, 1938 |
| 2,210,346 | Stayton | Aug. 6, 1940 |
| 2,246,866 | Stribling | June 24, 1941 |
| 2,275,594 | Perry | Mar. 10, 1942 |
| 2,356,950 | Root | Aug. 29, 1944 |

FOREIGN PATENTS

| Number | Country | Date |
| --- | --- | --- |
| 668,448 | France | Oct. 3, 1929 |